(No Model.)
R. WALRATH.
TROWEL.
No. 515,890. Patented Mar. 6, 1894.
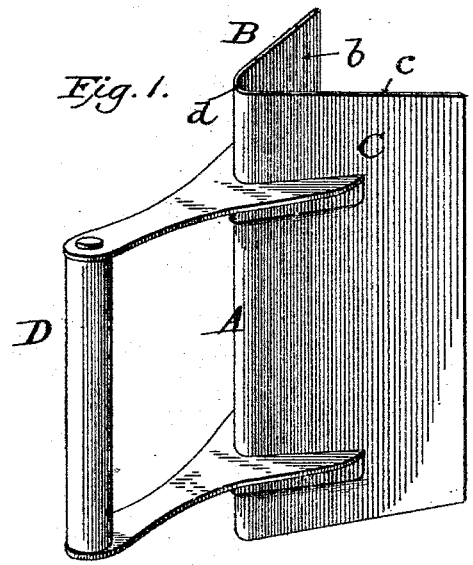
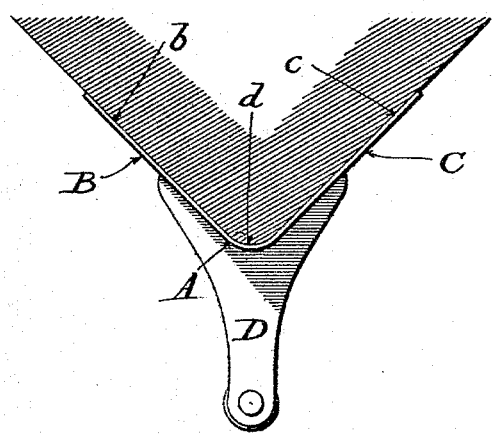
Witnesses:
C. B. Bull.
Horace A. Dodge.
Robert Walrath,
Inventor:
by Dodge Sons
Atty.

UNITED STATES PATENT OFFICE.

ROBERT WALRATH, OF LITTLE FALLS, NEW YORK, ASSIGNOR OF ONE-HALF TO CHARLES R. CASLER, OF SAME PLACE.

TROWEL.

SPECIFICATION forming part of Letters Patent No. 515,890, dated March 6, 1894.

Application filed June 7, 1893. Serial No. 476,889. (No model.)

*To all whom it may concern:*

Be it known that I, ROBERT WALRATH, a citizen of the United States, residing at Little Falls, in the county of Herkimer and State of New York, have invented certain new and useful Improvements in Trowels, of which the following is a specification.

My invention relates to trowels, and the invention consists in a novel construction of a trowel for finishing or forming the projecting corners of walls.

Great difficulty has been experienced by plasterers in making a neat finish at the corners, but this is obviated by the construction illustrated in the drawings, in which—

Figure 1 is a perspective view of my improved trowel; and Fig. 2, a top plan view showing the manner of using the trowel.

A indicates the main body of the trowel which is provided with, or comprises, two wings or blades B and C; the body A being advisably made of a single piece of sheet metal, cut and bent to proper form. The wings or blades B, C, are arranged approximately at right angles to each other, and their working faces *b c*, opposite, or opposed to each other, will advisably be connected by a slight curve, as at *d*, so as to give a rounded finish to the corner.

D indicates a handle which may be secured to the main body A in any suitable manner, but advisably by means of soldering as it is of course impracticable to have any projection or unevenness on the working faces. While I prefer to make the body of sheet metal, I do not wish to limit myself to that material; nor do I wish to restrict myself to any particular form of wings or blades. The blades must, however, be arranged approximately at right angles to each other, with their working faces opposed, as shown.

Having thus described my invention, what I claim is—

1. A trowel for finishing projecting corners, having two blades or wings B, C, arranged approximately at right angles to each other, with their working faces opposed.

2. A trowel for finishing projecting corners, comprising two blades B and C arranged with their working faces *b*, *c*, approximately at right angles to each other; said opposed working faces being connected by a curved surface *d*, all substantially as shown.

In witness whereof I hereunto set my hand in the presence of two witnesses.

ROBERT WALRATH.

Witnesses:
LUTHER MARCELLUS,
JOHN VINCENT.